(12) United States Patent
Choi et al.

(10) Patent No.: US 9,170,730 B2
(45) Date of Patent: Oct. 27, 2015

(54) METHOD FOR EXECUTING PRIVATE MODE IN MOBILE TERMINAL AND MOBILE TERMINAL USING THE SAME

(75) Inventors: Hyejin Choi, Seoul (KR); Yunjung Kim, Seoul (KR); Hyunsun Lyu, Seoul (KR); Hyojung Lee, Seoul (KR); Yunjueng Mhun, Seoul (KR); Hyeeun Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 419 days.

(21) Appl. No.: 12/964,451

(22) Filed: Dec. 9, 2010

(65) Prior Publication Data
US 2012/0019456 A1 Jan. 26, 2012

(30) Foreign Application Priority Data
Jul. 21, 2010 (KR) .......................... 10-2010-0070687

(51) Int. Cl.
G06F 3/041 (2006.01)
G06F 3/0488 (2013.01)
G06F 3/0484 (2013.01)
G06F 21/83 (2013.01)

(52) U.S. Cl.
CPC ........ *G06F 3/04883* (2013.01); *G06F 3/04847* (2013.01); *G06F 21/83* (2013.01); *G06F 2203/04104* (2013.01)

(58) Field of Classification Search
CPC ................... G06F 3/04847; G06F 2203/04104
USPC .................................... 345/173–178; 715/863
See application file for complete search history.

(56) References Cited

U.S. PATENT DOCUMENTS

| 2005/0288571 | A1* | 12/2005 | Perkins et al. | 600/407 |
| 2007/0288779 | A1* | 12/2007 | Kim | 713/320 |
| 2008/0234849 | A1* | 9/2008 | Han | 700/94 |
| 2010/0293500 | A1* | 11/2010 | Cragun et al. | 715/784 |
| 2011/0302530 | A1* | 12/2011 | Harris et al. | 715/810 |

* cited by examiner

*Primary Examiner* — Dennis Joseph
(74) *Attorney, Agent, or Firm* — Birch, Stewart, Kolasch & Birch, LLP

(57) ABSTRACT

Disclosed is a method for executing a private mode in a mobile terminal, including sensing a multi-touch applied over a display part, determining whether the multi-touch is identical with a touch code for entering to the private mode preset in a storage part, and turning off the display part or controlling a screen brightness when the multi-touch is identical with the touch code.

2 Claims, 6 Drawing Sheets

(a)

(b)

METHOD FOR EXECUTING PRIVATE MODE IN MOBILE TERMINAL AND MOBILE TERMINAL USING THE SAME

CROSS-REFERENCE TO RELATED APPLICATIONS

Pursuant to 35 U.S.C. §119 (a), this application claims the benefit of earlier filing date and right of priority to Korean Application No. 10-2010-0070687, filed on Jul. 21, 2010, the contents of which are hereby incorporated by reference herein in their entirety

FIELD OF THE DISCLOSURE

The present invention relates to a novel method for executing a private mode in a mobile terminal and a novel mobile terminal using the same, and more specifically, relates to the method and the mobile terminal using the same wherein when a predetermined multi-touch is inputted over a touch screen, its display part is turned off or a brightness of the screen decreases to darken, thereby being able to hide screen images currently displayed on the display part of the mobile terminal from unknown people.

DISCUSSION OF THE RELATED ART

Typically, the mobile terminal is portable equipment including at least one of functions such as audio and video phone calls, input/output of information, storage of data, etc. Therefore, the mobile terminal is provided with complicate functions such as, shooting a photograph or a video, playing a music file or a video file, playing a game, receiving a broadcast, etc. In compliance with such various functions, the mobile terminal should be implemented in a composite forms of multimedia player. In order to realize the multimedia player having such complicated functions, there have been implemented various fresh attempt using hardware or software. As an example, there has been provided a user interface in which the user can easily and conveniently search or select a desired function. Owing to such circumstance, it has raised a problem that images currently displayed on a screen by a user manipulation may be exposed to other people. Accordingly, in order to hide the currently displayed image from unknown people, there have been attempts, for example, attaching a security film for making narrow their viewing angle to a display, on one hand, and turning off the display using a lock button on the other hand.

However, the attempts have still problems that should unnecessarily use a separate attachment or the button operation as mentioned above.

SUMMARY OF THE DISCLOSURE

To solve the above-mentioned problems occurring in the prior art, in accordance with one embodiment of the present, there is provided a novel method for executing a private mode in the mobile terminal, comprising sensing a multi-touch applied over a display part, determining whether the multi-touch is identical with a touch code for entering to the private mode preset in a storage part, and turning off the display part or controlling a screen brightness when the multi-touch is identical with the touch code.

In accordance with one aspect of one embodiment of the present invention, the method further comprises changing the screen brightness of the display part to preset screen brightness when the multi-touch is identical with the touch code.

In accordance with another aspect of one embodiment of the present invention, the multi-touch is applied by touching at least one of both palms, one palm and two or more fingers over the display part.

In accordance with another aspect of one embodiment of the present invention, the touch code is preset by inputting one or more of touches over the display part.

In accordance with another aspect of one embodiment of the present invention, the method further comprises turning on the display part when an impact greater than preset is detected or when a predetermined touch is applied over the display part.

To resolve the above-mentioned problems, in accordance with other embodiment of the present invention, there is provided another novel method for executing a private mode in mobile terminal, comprising sensing a multi-touch applied over a display part, counting a touch area according to the multi-touch, determining whether the touch area is same or greater than a reference value preset in a storage part, and entering to the private mode, when the touch area is same or greater than the reference value, whereby the display part being turned off or a screen brightness being controlled to darken.

In accordance with an aspect of other embodiment of the present invention, the method further comprises inputting a user's input for setting the private mode, displaying a private mode setting-menu presenting a plurality of percentages for touch areas compared with a whole area of the display part to select one of the percentages, and storing as a reference value the touch area corresponding to the percentage selected in the private mode setting-menu.

To resolve the above problems, in accordance with other embodiment of the present invention, there is provided a mobile terminal, comprising a display part for displaying an information processed, a storage part for storing a touch code for entering to a preset private mode, and a control part for controlling the display part to turn off when an input multi-touch is identical with a touch code stored in the storage part.

In accordance with another aspect of other embodiment of the present invention, the control part controls to change screen brightness of the display part to preset screen brightness when the multi-touch is identical with the touch code stored in the storage part.

In accordance with another aspect of other embodiment of the present invention, the multi-touch is applied by touching at least one of both palms, one palm and two or more fingers over the display part.

In accordance with another aspect of other embodiment of the present invention, the touch code is preset by inputting one or more touches over the display part.

In accordance with another aspect of other embodiment of the present invention, the method further comprises comprising an acceleration sensor for sensing an impact, wherein the control part controls to turn on the display part when the impact sensed by the acceleration sensor is greater than a preset impact.

DETAILED DESCRIPTION OF PREFERRED EMBODIMENTS

Hereinafter, the mobile terminal associated with the present invention will be described with reference to the accompanying drawings. In the specification, the words of "module" and "part" are only for the clearance of specification and they do not have any special meaning or role.

The mobile terminal described in the specification may include a mobile phone, a smart phone, notebook/laptop computers, a terminal for a digital broadcast, a PDA (Personal Digital Assistants), a PMP (Portable Multimedia Player), navigation, etc.

However, though the embodiments described in the specification are cases applied only to the mobile terminal, but it may be applied to other wire devices such as a digital TV, a desktop computer.

Figure 1:
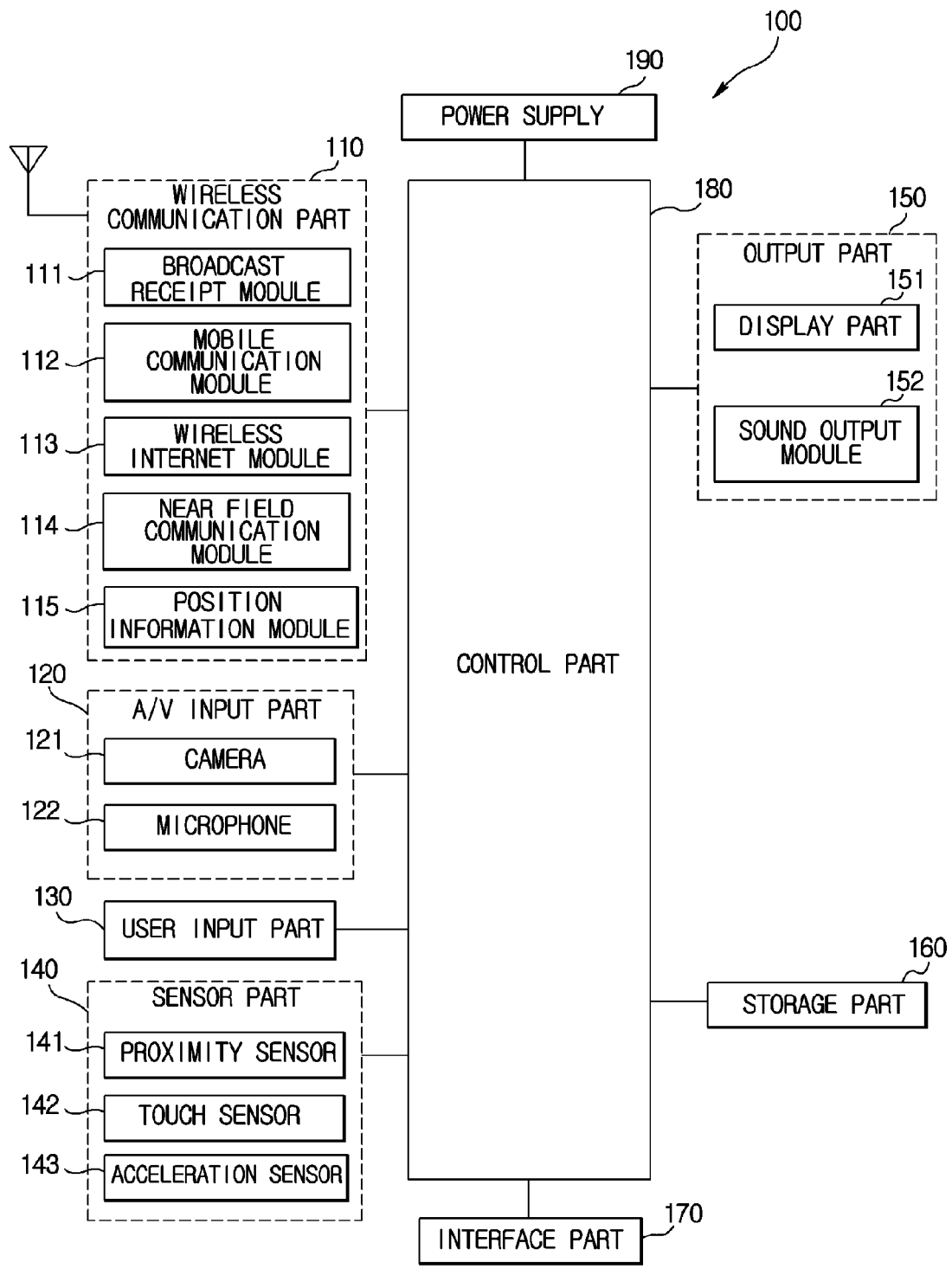
FIG. 1 is a block diagram of a mobile terminal associated with one embodiment of the present invention.

FIG. 1 is a block diagram of the mobile terminal associated with one embodiment of the present invention.

The mobile terminal 100 may include a wireless communication part 110, an A/V (Audio/Video) input part 120, a user input part 130, a sensor part 140, an output part 150, a storage part 160, an interface part 170, a control part 180 and a power supply 190, etc. Since the elements shown in FIG. 1 are not necessaries, it is possible to embody mobile terminals including more or lesser elements.

Now, it will be disclosed in turn with regard to the above elements.

The wireless communication part 110 may include one or more modules enabling to perform a wireless communication between the mobile terminal 100 and a wireless communications system or between the mobile terminal 100 and a network in which the mobile terminal 100 is located. For example, the wireless communication part 110 may include a broadcast receipt module 111, a mobile communication module 112, a wireless Internet module 113, a near field communication module 114 and a position information module 115, etc.

The broadcast receipt module 111 receives broadcast signal and/or broadcast-related information via the broadcast channel from an external broadcast control server. The broadcast channel may include a satellite channel and a ground wave channel. The broadcast control server may be a server generating and transmitting the broadcast signal and/or the broadcast-related information, or a server receiving and transmitting the broadcast signal and/or the broadcast-related information which have been already generated. The broadcast signal may include not only TV broadcast signal, radio broadcast signal and a data broadcast signal, but also even TV broadcast signal or radio broadcast signal with data broadcast signal. The broadcast-related information may be associated with broadcast channel, broadcast program or broadcast service provider. The broadcast-related information can be provided even through the mobile communication network. In this case, the information can be received by the mobile communication module 112.

The broadcast signal and/or the broadcast-related information received via the broadcast receipt module 111 can be stored in the storage part 160.

The mobile communication module 112 sends and receives wireless signal to and from at least one of a base station, an external terminal and a server in the mobile communication network. The wireless signal may include a various form of data according to the sending/receiving of a voice call signal, a video call signal or character/multimedia message.

The wireless internet module 113 refers to a module for accessing a wireless internet, and can be installed in interior or exterior of the mobile terminal.

The near field communication module 114 refers to a module for communicating in near distance.

The position information module 115 refers to a module for positioning of mobile terminal. A typical example is a GPS (Global Position System) module.

Referring to FIG. 1, the A/V (Audio/Video) input part 120 is for inputting an audio signal or a video signal, and it may include a camera 121 and a microphone 122. The camera 121 processes a video frame such as static image and dynamic images captured by an image sensor in video call mode or shoot mode. The processed video frame can be displayed in a display part 151.

The user input part 130 is a device with which the user generates an input data for controlling the operation of the terminal. The user input part 130 includes a key pad, a dome switch, a touch pad (static pressure type/electrostatic type), a jog wheel, a jog switch, etc.

The sensor part 140 senses current status of the mobile terminal 100 such as an on/off state of the mobile terminal 100, a position of the mobile terminal 100, an existence of the user's touch, an orientation of the mobile terminal 100, an acceleration/deceleration of the mobile terminal 100, etc. to generate a signal for controlling the operation of the mobile terminal 100. Further, it may also sense whether the power supply part 190 supplies the power, whether a interface part 170 is connected to an external equipment, and the likes. While, the sensor part 140 can include a proximity sensor 141, a touch sensor 142 and an acceleration sensor 143.

The acceleration sensor 143 senses the acceleration of the mobile terminal or the magnitude of the impact, and can be classified into an inertia type, a gyroscope type and a silicon semiconductor type according to the detection manner. Herein, the acceleration sensor 143 senses direction of the mobile terminal and magnitude of impact with the position change due to user's movement or swing to output electric signals. The outputted electric signals are transmitted to the control part 180.

The output part 150 generates outputs associated with senses such as sight, hearing, touch or the likes, and accordingly, it may include the display part 151, a sound output module 152 and the likes.

The display part 151 displays information processed in the mobile terminal. As an example, in a voice call mode, the mobile terminal 100 displays an UI (User Interface) or a GUI (Graphic User Interface) associated with the talk mode. The mobile terminal 100 displays also a shoot image and/or a received image, the UI or the GUI during the video call mode or the shoot mode.

The display part 151 may include at least one of a liquid crystal display (LCD), a thin film transistor-liquid crystal display (TFT LCD), an organic light-emitting diode (OLED), a flexible display, and a 3D display.

In case that the display part 151 and the sensor for sensing a touch operation (hereinafter, referred to 'touch sensor')

make up a mutual layer structure (hereinafter, referred to 'touch screen'), the display part 151 can be used as an output device as well as an input device. The touch sensor 142 may be one of a touch film, a touch seat, a touch pad, etc., for example.

While, the touch sensor 142 converts a variation of a pressure applied to a specific region of the display part 151 or an electrostatic capacity occurred in the specific region of the display part 151, etc. to an electric input signal. In addition, the touch sensor 142 can detect not only a touch position and a touch area, but also a touch pressure.

When a touch input for the touch sensor 142 exists, the signal corresponding thereto is sent to the touch controller. The touch controller processes the received signal and transmits the corresponding data to the control part 180. As the result, the control part 180 can recognize where any region of the display part 151 has been touched.

Referring to FIG. 1, the proximity sensor 141 can be arranged at an internal region covered by the touch screen of the mobile terminal or at a neighbor region thereof. Herein, the proximity sensor 141 refers to a sensor for detecting an object approaching to a certain detection surface or an object in near field using an electromagnetic field force or an infrared ray without any mechanical contact. The proximity sensor 141 has a longer life than the touch type sensor and thus, its utility is also high.

The proximity sensor 141 is, for example, a transmission electro optic sensor, a direct reflection electro optic sensor, a mirror reflection electro optic sensor, a high frequency oscillation proximity sensor, an electrostatic capacity proximity sensor, a magnetic proximity sensor, an infrared proximity sensor, etc. In case that the touch screen is the electrostatic type, the sensor detects the proximity of a pointer by a variation of the magnetic field according to the approach of the pointer thereto. In this case, the touch screen (touch sensor) may be classified into the proximity sensor.

The sound output module 152 may output an audio data received from the wireless communication part 110 or stored in the storage part 160. The sound output module 152 also may output the audio signal associated with functions (e.g., a call signal receipt sound, a message receipt sound, etc.) performed in the mobile terminal. The sound output module 152 may include a receiver, a speaker, a buzzer, etc.

The storage part 160 may store a program for operating the control part 180 and also may temporarily store the input/output data (e.g. a phone book, a message, a static image, a dynamic image, etc.) therein. The storage part 160 can also store data associated with various output patterns of vibration and sound when the user touches over the touch screen. In addition, the storage part 160 may store a touch code according to the form of the private mode preset by user. The embodiment for setting (registering) the touch code of the private mode through a window will be explained in detail with reference to FIG. 3.

The storage part 160 may include at least one medium of a flash memory type, a hard disk type, a multimedia card micro type, a card type memory (e.g. SD or XD memory, etc.), a RAM (Random Access Memory), a SRAM (Static Random Access Memory), a ROM (Read-Only Memory), an EEPROM (Electrically Erasable Programmable Read-Only Memory), a PROM (Programmable Read-Only Memory), a magnetic memory, a magnetic disk and an optical disk. In the internet, the mobile terminal 100 may operate in cooperation with a web storage performing the same storage as the above storage part 160.

The interface part 170 plays a role of pathway communicating with all external equipments connected to the mobile terminal 100. More specifically, the interface part 170 receives data from the external equipment, sends the supplied power to each of the elements of the mobile terminal, or transmits the internal data to the external equipments. For example, it may include a wire/wireless headset port, an external charger port, a wire/wireless data port, a memory card port, a port for connecting a device having an identification module, an audio I/O (Input/output) port, a video I/O (Input/output) port, an earphone port, etc.

The control part 180 controls commonly the overall operations of the mobile terminal. In particular, it performs the controlling and processing associated with a voice call, a video call, a data communication, etc. More specifically, the control part 180 performs a pattern recognition process in which writing input or drawing input on the touch screen is recognized as character or image. Further, when the user inputs a predetermined multi-touch over the display part 151 (herein, 'touch screen'), the control part 180 senses the touch input and determines whether the input multi-touch is identical with the preset touch code stored previously in the storage part 160. Furthermore, if the input multi-touch is identical with the preset touch code, it allows to enter to the private mode and thereby to turn off the display part or to change the screen brightness of the display part to the preset brightness. It will be disclosed in detail with regard to the control part 180 controlling the entrance into the private mode with reference to FIG. 2.

By control of the control part 180, the power supply part 190 supplies the provided power required for operating the elements.

Various embodiments for the control part explained in the below may be embodied in the recording medium readable by a computer or apparatuses similar thereto, using a software, a hardware or a combination thereof, for example.

According to implementing by the hardware, the embodiments hereof may be implemented using at least one of ASICs (application specific integrated circuits), DSPs (digital signal processors), DSPDs (digital signal processing devices), PLDs (programmable logic devices), FPGAs (field programmable gate arrays), processors, controllers, micro-controllers, microprocessors and electric units for executing other function. Occasionally, the embodiments described in this specification may be implemented using the control part itself 180.

According to implementing by the software, the embodiments such as procedures and functions explained in this specification may be implemented using separate software modules. Each of the software modules can prosecute one or more functions and operations as disclosed in this specification. A software code can be set using a software application written by a proper program language and then can be stored in the storage part 160 to be processed by the control part 180.

Hereinafter, it will be explained with regard to the execution method of such private mode that, when a predetermined multi-touch is inputted over the touch screen of the present invention, the image currently displaying on the screen of the mobile terminal can be hidden from other people by turning off the display part or decreasing brightness of the screen to darken.

Figure 2:
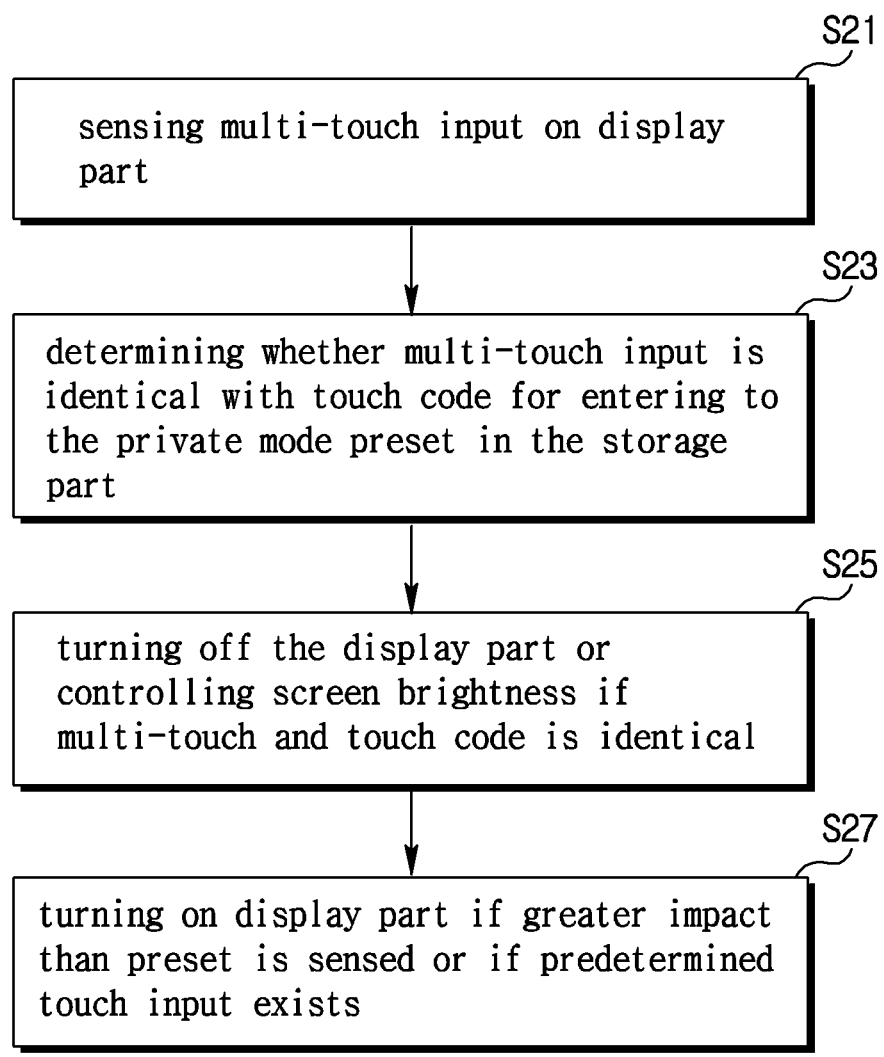
FIG. 2 is a flowchart showing a method for executing a private mode in the mobile terminal in accordance with one embodiment of the present invention.

FIG. 2 is a flowchart showing a method for executing a private mode in a mobile terminal in accordance with one embodiment of the present invention.

As see in the FIG. 2, the control part controls to display at least one of the display images executed on the display part (herein referred to 'touch screen'). After that, if the user inputs a predetermined multi-touch over the display part, the control part senses the multi-touch input (S21) to determine whether the multi-touch input is identical with the preset touch code stored previously in the storage part for entering to the private mode (S23). Herein, the multi-touch input can be accomplished by touching the display part with any one of both palms, one palm, and two or more fingers. Further, the touch code for entering to the private mode can be set previously through the window for setting by the user. With regard to the process for setting the touch code for entering to the private mode will be described in detail in the below explanation referring to FIG. 3.

In next step, the control part, when the multi-touch input is identical with the touch code stored in the storage part, enters to the private mode where the currently displayed image can be hidden to turn off or to change the brightness of the display pars (S25). In the state where the display part is turned off or the brightness is darkened, if the user moves or shakes the mobile terminal to at least any one of directions, the acceleration sensor senses the position change to transmit an electrical signal corresponding to the magnitude of impact due to the position displacement to the control part. When the magnitude of impact is greater than the preset magnitude of impact, the control part turn on the display part again whereby being able to release or escape from the private mode (S27).

As above, the user is able to easily hide the currently displayed image of the mobile terminal from a gaze of other people by only applying simply the predetermined multi-touch over the display part.

Figure 3:
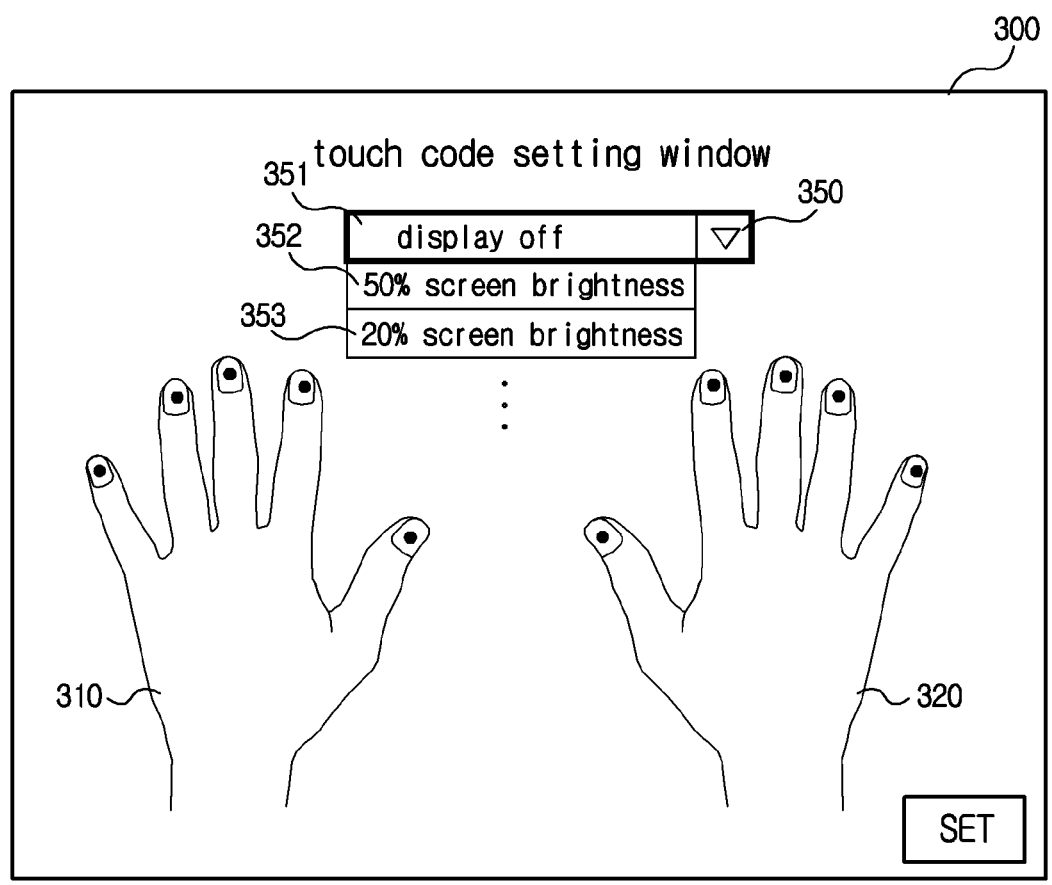
FIG. 3 is an image diagram of the mobile terminal for setting a touch code in accordance with one embodiment of the present invention.

FIG. 3 is an image diagram of the mobile terminal that can set a touch code in accordance with one embodiment of the present invention.

As see in the FIG. 3, the user can set the touch code for entering to the private mode through the private mode setting menu (not shown) on the window for the touch code setting.

In compliance with user's selection or touch on the private mode setting menu, the control part controls to display the touch code setting window 300 on the display part. If the user selects or touches a pop-up icon 350 displayed on the touch code setting window 300, the control part controls to display the setting menu such as a displaying-off 351, a 50% brightness 352, and a 20% brightness 353, so that the user can touch to select one of them on the setting menu.

Thereafter, if the user inputs one or more multi-touches over a hand-shaped touch code input plates 310, 320 on the display part, the control part processes signals according to the multi-touch positions to transmit the corresponding data to the control part. The control part recognizes that the received data is the touch code for entering to the private mode and stores it in the storage part.

In FIG. 3, as one example, though it has been described a case that the multi-touch input for entering to the private mode is set with ten multi-touch codes of 10 fingers, but it is not defined thereto and it is also possible for the user to preset by the touch input using at least one of the both palms, one palm or two or more fingers as the touch code.

Thus, the user can simply set a private touch code for entering to the private mode using the touch code setting window.

Figure 4:
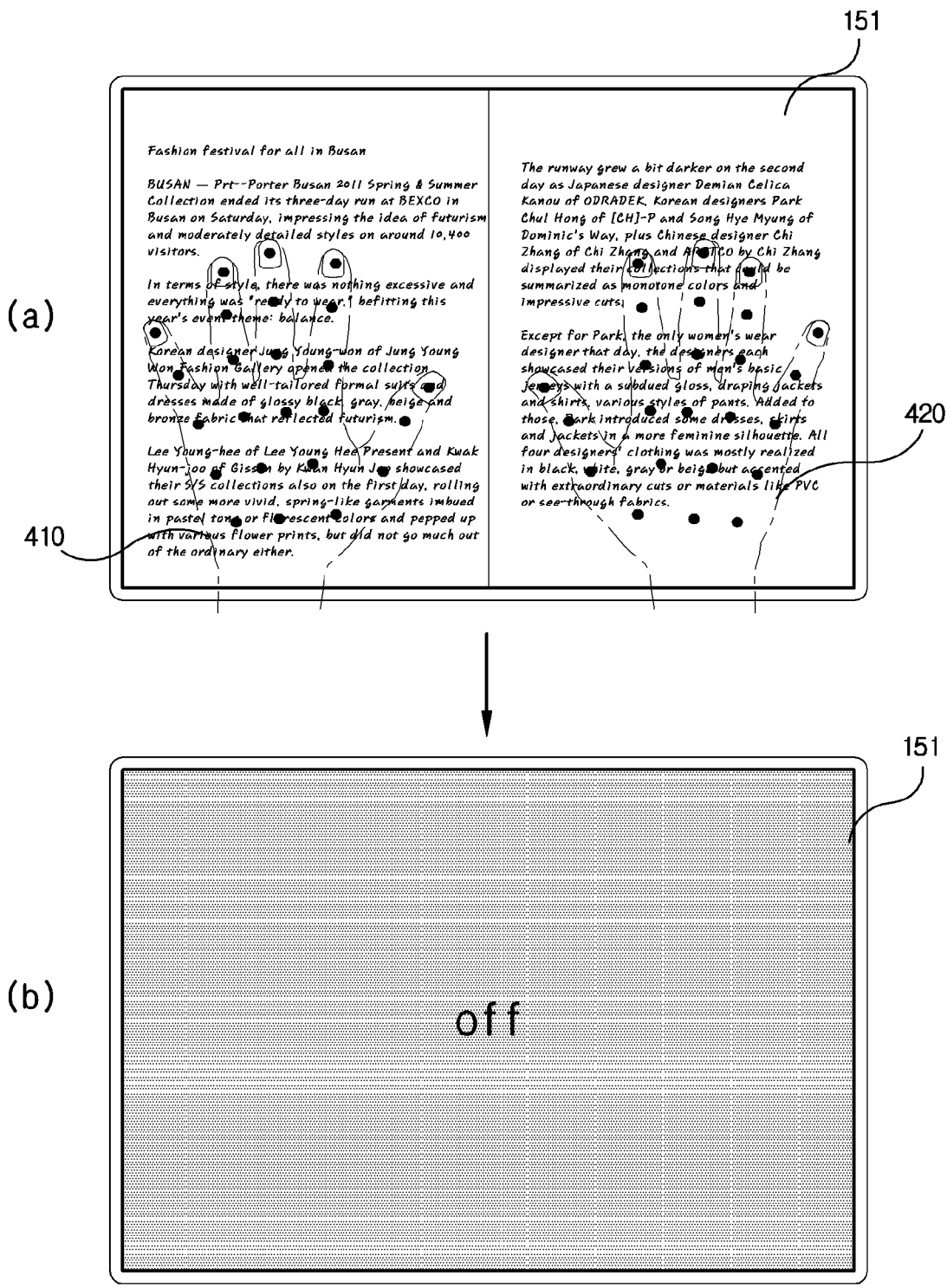
FIG. 4 is an image diagram of the mobile terminal showing that a display is turned off according to a multi-touch input in accordance with the present invention.

FIG. 4 is a image diagram of the mobile terminal showing that a display part is turned off according to a multi-touch input in accordance with the present invention.

As see in FIG. 4(a), the control part controls to display at least one of execution images on the display part 151 (herein, referred to 'touch screen'). Here, it is assumed that the touch code for entering to the private mode has been set with a multi-touch input by contacting the 'both palms' over the touch screen 151 and the entrance form of the private mode has been set with the 'displaying-off'. To hide the currently displayed image of the mobile terminal, if the user touches the 'both palms' over the touch screen 151 as multi-touch input, the control part controls the sensor to sense the multi-touch input to determine whether the multi-touch input is identical with the stored touch code (by the multi-touch of 'both palms'). If it is determined that the data according to the user's multi-touch input of the 'both palms' is identical with the data of the 'private touch code' stored in the storage part, as see in the FIG. 4(b), the control part controls to turn off the touch screen 151.

Figure 5:
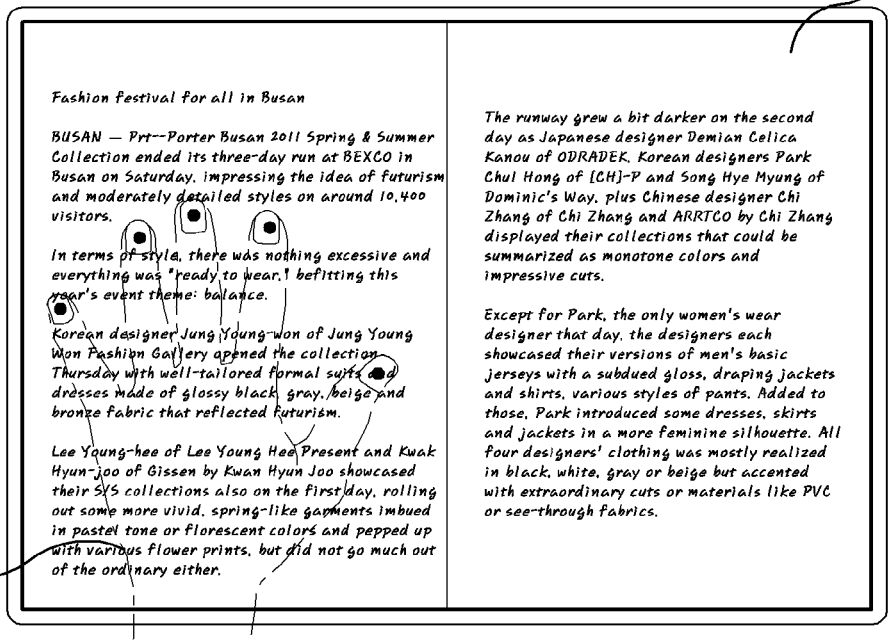
FIG. 5 is an image diagram of the mobile terminal showing that a brightness of the display is controlled according to the multi-touch input in accordance with one embodiment of the present invention.
Figure 5:
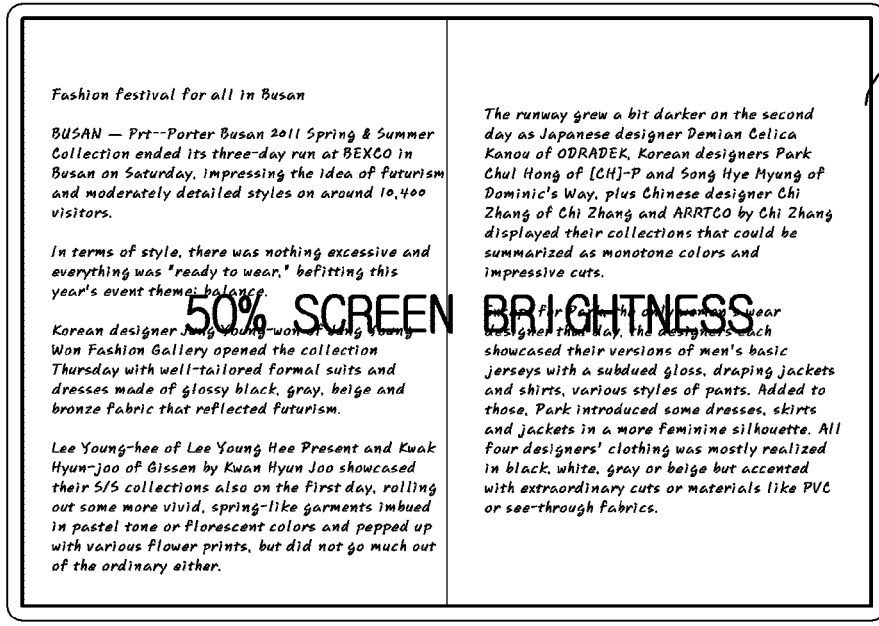

FIG. 5 is an image diagram of the mobile terminal showing that a brightness of the display part is controlled according to the multi-touch input in accordance with one embodiment of the present invention.

As see in FIG. 5(a), the control part controls to display at least one of execution images on the display part 151 (herein, referred to 'touch screen'). Here, it is assumed that the touch code for entering to the private mode has been set with the multi-touch codes of 'left hand's five fingers' and the entrance form of the private mode has been set with the '50% brightness' of the display part. To hide the currently displayed image of the mobile terminal, if the user touches the 'left hand's five fingers' 510 over the touch screen 151 as a multi-touch input, the control part controls to sense the multi-touch input and determines whether it is identical with the stored touch code (by the multi-touch input of the 'left hand's five fingers'). If it is determined that the data according to the multi-touch of the 'left hand's five fingers' is identical with the data of the private touch code stored in the storage part, as see in the FIG. 5(b), the control part controls to decrease 50% of the brightness of the touch screen 151.

Though there is provided, as an example in the above embodiment, a case that the touch code is preset by the touch input, but it is also possible to allow to enter to the private mode without any setting of touch code. Further, it is also possible to allow entering to the private mode if the comparison of the input touch area and the whole area of display part is over a predetermined level. As an example, there is a case where the input touch area is over 50% of the whole area of display part. In this case, the desired guidance of menu can be executed by assigning at least one of rates of the touch areas compared with the whole area of the setting menu displayed.

Figure 6:
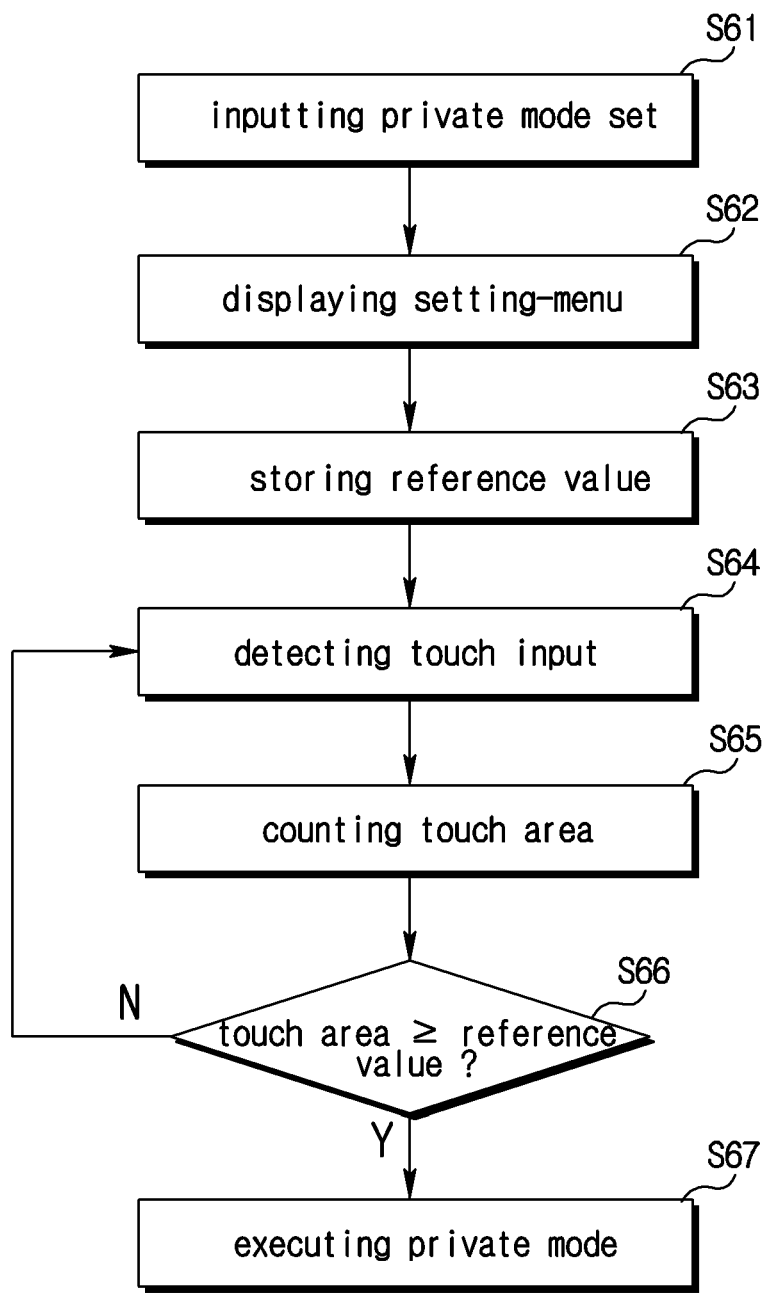
FIG. 6 is a flowchart showing a process for executing the private mode in the mobile terminal in accordance with other embodiment of the present invention.

FIG. 6 is a flowchart showing a method for executing a private mode in a mobile terminal in accordance with another embodiment of the present invention.

As see in FIG. 6, the user can set the private mode setting menu (not shown) for entering to the private mode. If the user inputs the private mode setting-menu through the user input part 130 (S61), the setting menu can be displayed on the display part 151 (S62). The setting menu presents percentages of the touch areas compared with the whole area of the display part 151, for example, 50%, 60%, 70% and more, etc. At this time, the whole area of the display part 151 is previously stored in the storage part 160. If a user's touch is inputted, the percentage of the user's touched area compared with the whole area inputted is stored as a reference value (S63) in the storage part.

The control part displays at least one of execution screen images on the display part (herein, referred to 'touch screen'). Hereinafter, if the user inputs (touches) a predetermined multi-touch input over the display part, the control part controls to sense the multi-touch input (S64), and then to count the touch area of the multi-touch (S65), and then to compare the counted touch area with the stored reference value (S66). If the touch area is larger than the reference value or same, the control part controls to allow the user's entrance into the private mode, to turn off the display part or to change the screen brightness to the preset screen brightness (S67), so that the currently displayed image can be hidden from other people. On the contrary, if the touch area is smaller than the reference value, it controls to return to the step S64.

Thus, the user can set (or register) the private touch code for entering to the private mode, whereby the mobile terminal can easily and conveniently enter to the preset private mode by use's inputting the multi-touch.

In addition, in accordance with the present invention, the abovementioned method can be embodied with a code which a processor is readable from a programmable media. The programmable media includes, for example, a ROM, a RAM, a CD-ROM, a magnetic tape, a floppy disk, an optical data memory, etc. and also may be embodied in the form of a carrier wave (e.g. transmission through an internet).

While the invention has been shown and described with reference to exemplary embodiments thereof, it will be understood by those skilled in the art that various changes in form and details may be made therein without departing from the spirit and scope of the invention as defined by the appended claims.

What is claimed is:

1. A method for executing a private mode in a mobile terminal, the method comprising:
   receiving, by a processor, a multi-touch presetting input to enter a private mode setting menu on a display unit;
   receiving, by the processor, via the private mode setting menu on the display unit, a touch input by a first number of fingers, a touch input by a second number of fingers, and a touch input by at least one palm corresponding to first, second, and third multi-touch codes, respectively, and corresponding to first, second, and third screen brightness levels, respectively, of the display unit of the mobile terminal, wherein the first and second numbers of fingers are different;
   storing, by a storage unit, the first, second, and third multi-touch codes corresponding to the first, second, and third screen brightness levels, respectively;
   receiving, by the processor, a multi-touch input on the display unit;
   determining, by the processor, which multi-touch code among the first, second, and third multi-touch codes corresponds to the received multi-touch input by the first or second number of fingers or the at least one palm;
   changing, by the processor, a degree of brightness of the display unit according to the first, second, or third brightness level corresponding to the multi-touch code corresponding to the received multi-touch input by the first or second number of fingers or the at least one palm, respectively;
   sensing an impact using an acceleration sensor, wherein a control unit is configured to control the display unit to be turned on when the impact sensed by the acceleration sensor is greater than a preset value; and
   wherein at least one of the multi-touch codes includes at least one finger touching the display unit, remaining substantially stationary, and then ceasing to touch the display unit.

2. A mobile terminal comprising:
   a display unit configured to display an information processed and receive an input by an input medium;
   a control unit configured to:
      receive a multi-touch presetting input to enter a private mode setting menu on the display unit, and
      receive, via the private mode setting menu on the display unit, a touch input by a first number of fingers, a touch input by a second number of fingers, and a touch input by at least one palm corresponding to first, second, and third multi-touch codes, respectively, and corresponding to first, second, and third screen brightness levels, respectively, of the display unit of the mobile terminal, wherein the first and second numbers of fingers are different: and
   a storage unit configured to store the first, second, and third multi-touch codes corresponding to the first, second, and third screen brightness levels, respectively,
   wherein the control unit is further configured to:
      receive a multi-touch input on the display unit,
      determine which multi-touch code among the first, second, and third multi-touch codes corresponds to the received multi-touch input by the first or second number of fingers or the at least one palm, and
      change a degree of brightness of the display unit according to the first, second, or third brightness level corresponding to the multi-touch code corresponding to the received multi-touch input by the first or second number of fingers or the at least one palm, respectively;
   an acceleration sensor configured to sense an impact, wherein the control unit is further configured to control the display unit to be turned on when the impact sensed by the acceleration sensor is greater than a preset value; and
   wherein at least one of the multi-touch codes includes at least one finger touching the display unit, remaining substantially stationary, and then ceasing to touch the display unit.

* * * * *